United States Patent
Mäkelä

(10) Patent No.: US 9,551,368 B2
(45) Date of Patent: Jan. 24, 2017

(54) SPOOLING MACHINE

(75) Inventor: Kari Mäkelä, Helsinki (FI)

(73) Assignee: MAILLEFER S.A., Ecublens (CH)

( * ) Notice: Subject to any disclaimer, the term of this patent is extended or adjusted under 35 U.S.C. 154(b) by 248 days.

(21) Appl. No.: 14/237,196

(22) PCT Filed: Aug. 13, 2012

(86) PCT No.: PCT/FI2012/050782
§ 371 (c)(1),
(2), (4) Date: Feb. 19, 2014

(87) PCT Pub. No.: WO2013/026955
PCT Pub. Date: Feb. 28, 2013

(65) Prior Publication Data
US 2014/0191077 A1    Jul. 10, 2014

(30) Foreign Application Priority Data

Aug. 19, 2011  (FI) ........................... 20115809

(51) Int. Cl.
*F16B 7/14*   (2006.01)
*B65H 54/72*  (2006.01)
(Continued)

(52) U.S. Cl.
CPC ............... *F16B 7/14* (2013.01); *B65H 54/72* (2013.01); *B65H 75/4465* (2013.01); *D07B 7/10* (2013.01); *B65H 49/32* (2013.01); *F16B 7/1463* (2013.01)

(58) Field of Classification Search
CPC ....... B65H 16/06; B65H 49/32; B65H 49/325; B65H 75/24; B65H 75/241; B65H 75/242; B65H 75/243; B65H 54/54; B65H 54/553; B65H 54/72; F16B 7/14; F16B 7/1463; D07B 7/10
(Continued)

(56) References Cited

U.S. PATENT DOCUMENTS 2,816,769 A    12/1957  Noble
3,032,288 A *  5/1962  Tidland ................ B65H 75/243
                                              242/571.1
(Continued)

FOREIGN PATENT DOCUMENTS

EP    0144765 A2    6/1985
EP    0549276 A1    6/1993
(Continued)

OTHER PUBLICATIONS

Mar. 9, 2015 Search Report issued in European Patent Application No. 12825644.3.
(Continued)

*Primary Examiner* — Michael Mansen
*Assistant Examiner* — Nathaniel Adams
(74) *Attorney, Agent, or Firm* — Oliff PLC

(57) ABSTRACT

Spooling machine including two side frames spaced at a horizontal distance by a telescopic spacer beam, each frame having a pintle on supports for bearing a drum for cable pipe or hose, the telescopic spacer beam including at least one outer tube and at least one inner tube, which are slidably and telescopically one inside the other, and a locking device positioned between the outer tube and the inner tube for locking the outer and inner tube in adjustable position. The locking device includes a split part of the inner tube extending over a part of the length of the inner tube and dividing the inner tube into sections, and a force element for creating a swelling force on the split part of the inner tube to press the sections against the inner surface of the outer tube.

8 Claims, 2 Drawing Sheets

Figure 6:
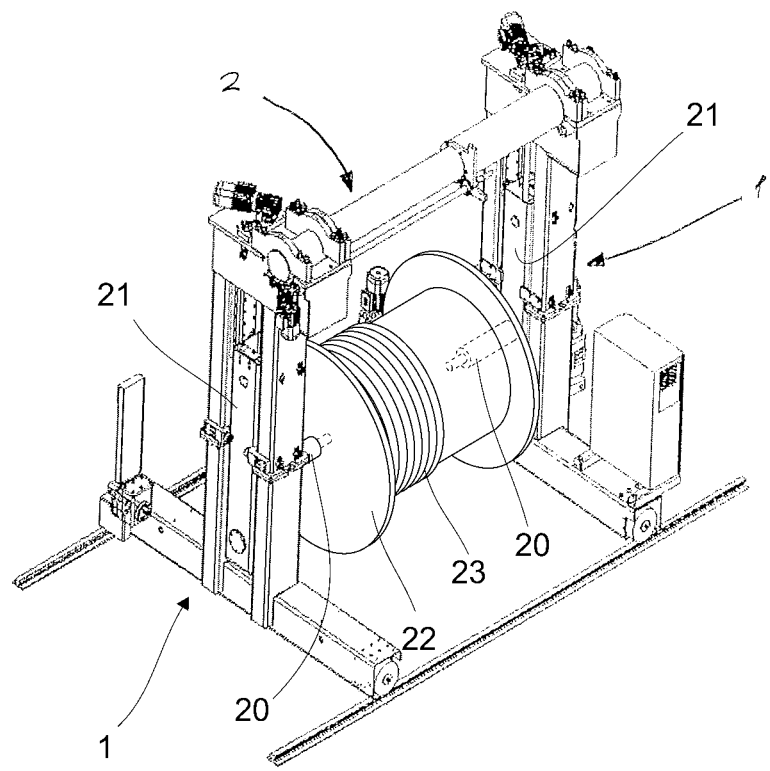

(51) Int. Cl.
*B65H 75/44* (2006.01)
*D07B 7/10* (2006.01)
*B65H 49/32* (2006.01)

(58) Field of Classification Search
USPC ............ 242/598.1, 598.3, 598.4, 599, 599.1,
242/533.7, 533.1; 403/109.1, 109.5
See application file for complete search history.

(56) References Cited

U.S. PATENT DOCUMENTS

| | | | |
|---|---|---|---|
| 3,098,669 A | | 7/1963 | Fortin et al. |
| 3,508,618 A | | 4/1970 | Walberg |
| 3,779,480 A | | 12/1973 | Cambou |
| 4,098,468 A | | 7/1978 | Skalleberg |
| 4,209,140 A | | 6/1980 | Seibert |
| 4,619,548 A | | 10/1986 | Kazaoka et al. |
| 4,679,743 A | | 7/1987 | Dallmaier |
| 4,718,817 A | | 1/1988 | Maillefer |
| 5,242,127 A | * | 9/1993 | Jaaskelainen ......... B65H 54/54 242/557 |
| 5,288,031 A | | 2/1994 | Linderoth |
| 5,314,083 A | * | 5/1994 | Wiggershaus ......... B66F 11/04 212/319 |
| 5,320,295 A | | 6/1994 | Jääskeläinen et al. |
| 6,299,100 B1 | | 10/2001 | Cloud |
| 2003/0150953 A1 | * | 8/2003 | Gent ................. A01G 13/0287 242/557 |
| 2008/0315058 A1 | | 12/2008 | Zarpellon |

FOREIGN PATENT DOCUMENTS

| | | |
|---|---|---|
| FR | 1597764 A | 6/1970 |
| GB | 2 450 742 A | 1/2009 |
| JP | A 52-74763 | 6/1977 |
| JP | U 52-135312 | 10/1977 |
| JP | U 58-34998 | 3/1983 |
| JP | S61-109904 U | 7/1986 |
| JP | 3008932 U | 3/1995 |
| JP | 2004-232372 A | 8/2004 |
| WO | 90/15771 A1 | 12/1990 |

OTHER PUBLICATIONS

Feb. 10, 2012 Search Report issued in Finnish Patent Application No. 20115809 (with translation).
Nov. 23, 2012 Written Opinion issued in International Patent Application No. PCT/FI2012/050782.
Nov. 23, 2012 Search Report issued in International Patent Application No. PCT/FI2012/050782.
Jun. 21, 2016 Office Action issued in Japanese Patent Application No. 2014-526528.

\* cited by examiner

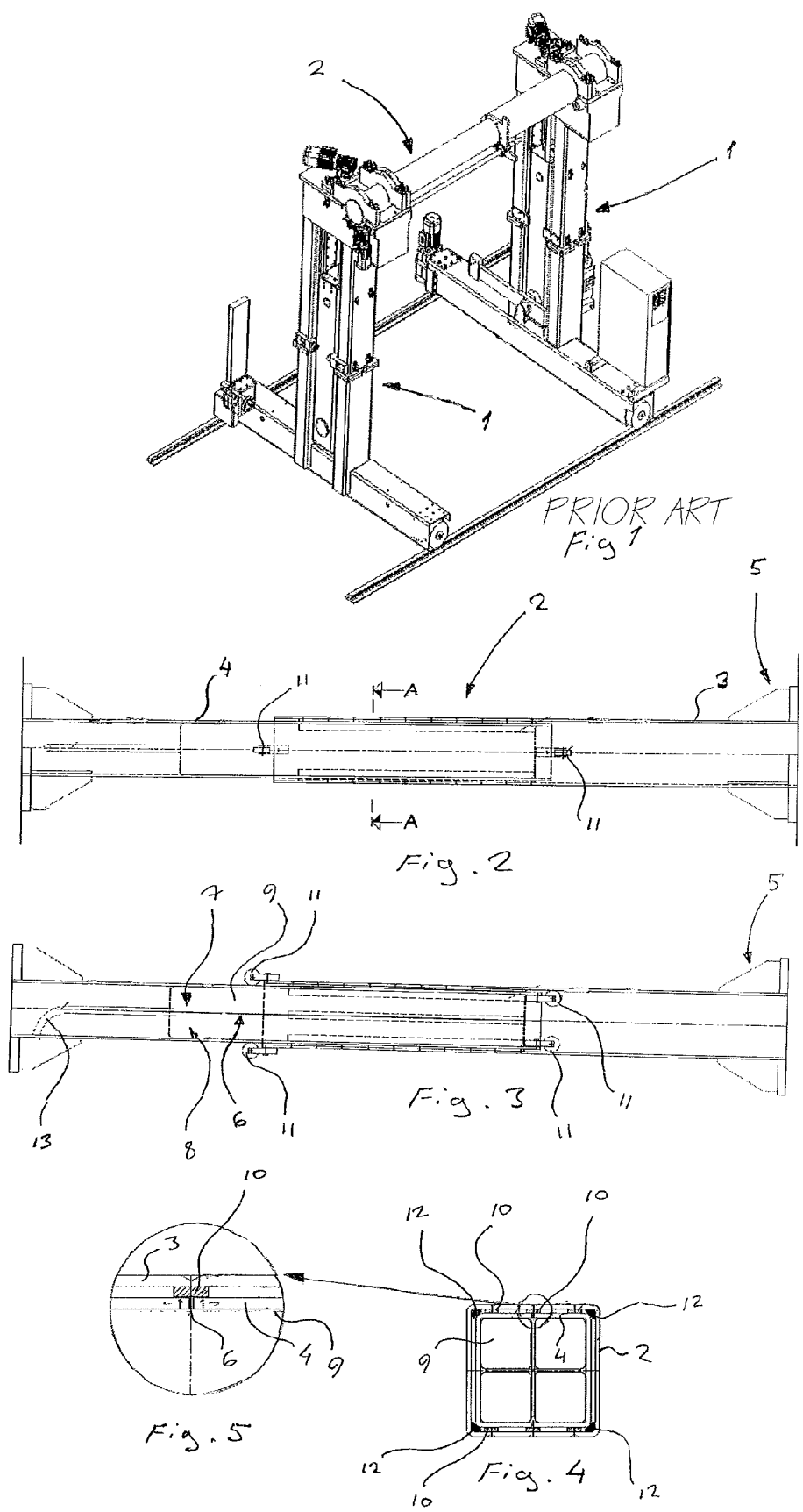

SPOOLING MACHINE

The invention relates to a spooling machine comprising two side frames spaced at a horizontal distance by a telescopic spacer beam, each frame having a pintle on supports for bearing a drum for cable pipe or hose, the telescopic spacer beam comprising at least one outer tube and at least one inner tube, which are slidably and telescopically one inside the other and a locking device positioned between the outer tube and the inner tube for locking the outer and inner tube in adjustable position.

As described above the invention relates to floor reeling devices, i.e. a pay-off devices or a take-up devices widely used for example in manufacturing electrical wires and cables, i.e. in various fields of cable manufacturing industry.

Reeling devices or spooling machines consist typically of two side frames spaced at a horizontal distance by a telescopic spacer beam. Each frame has a pintle on vertically movable supports. The supports support and bear the drum onto which a cable, pipe or hose is paid off or taken up.

Fastening of the reel or dismounting of the reel to the floor necessitates changing the side frame parts distance to release the pintles and therefore an adjustable spacer mechanism is needed. Width adjustment is also necessary to adapt for different drum widths. The spacer mechanism must also provide for backlash-free operation in order to ensure precise, safe and repeatable pickup and release of the reel.

In the field there are several constructions designed to meet the demands described above. A typical known structure uses frame distance adjustment achieved by means of a telescopic spacer structure in which a bar is made of a cylindrical rod sliding in a bushing similar to hydraulic cylinders. The precision fit of rod and bushing requires expensive precision manufacturing which means that the constructions used in the prior art rise the costs of for example cable manufacturing process.

As an example of typical prior art constructions a mechanism described in U.S. Patent Application Publication No. 2008/0315058 A1 can be mentioned. The construction shown in said publication has the disadvantages of the prior art described above.

The object of the invention is to obtain an arrangement by which the disadvantages of the prior art can be eliminated. This is achieved with the present invention. The present invention is characterized in that the locking device comprises a split part of the inner tube extending over a part of the length of the inner tube and dividing the inner tube into sections, and a force element for creating a swelling force on the split part of the inner tube to press the sections against the inner surface of the outer tube.

An advantage of the invention is its low manufacturing costs and therefore the use of the invention is very advantageous as a whole, i.e. the invention offers an economical way to obtain adjustable spacing function in connection with a reeling or a spooling machine.

The invention will now be explained in closer detail with reference to the embodiments shown in the attached drawing, whereby FIG. 1 shows an example of a spooling machine known in the field, FIG. 2 shows a front view of one embodiment of the arrangement of the invention, FIG. 3 shows a top view of the embodiment of FIG. 2, FIG. 4 shows a section along the line A-A shown in FIG. 2 and FIG. 5 is a detail of FIG. 4 shown in a larger scale.

FIG. 6 shows an example of a spooling machine in accordance with an embodiment of the invention.

FIG. 1 shows a typical spooling machine of the prior art. The spooling machine shown comprises two side frames 1 spaced at a horizontal distance by a telescopic spacer beam 2. The telescopic spacer beam 2 is in the prior art technique made of a cylindrical rod sliding in a bushing similar to hydraulic cylinders as described earlier. The construction shown is also provided with an appropriate locking device positioned between the outer tube and the inner tube for locking the outer and inner tube in adjustable position.

The construction shown has the disadvantages of the prior art described earlier.

The construction and the operation principle of the spooling machine described above are quite familiar to a person skilled in the art, and therefore said matters are not described here in detail.

As described above the invention offers an economical way to obtain the adjustable spacing function, i.e. an economical way to eliminate the expensive construction of the adjustable spacer beam used in the prior art.

FIGS. 2-6 show one embodiment of the present invention, i.e. one embodiment of the arrangement for a telescopic spacer beam of the invention.

In the embodiment shown in FIGS. 2-5 the spacer beam 2 comprise two square tube sections, i.e. an outer tube 3 and an inner tube 4. Said square tubes are made of commercial steel tubing and said tubes form a telescopic arrangement which can be seen clearly from FIGS. 2 and 3. As shown in FIG. 6, the spooling machine comprises two side frames 1 spaced at a horizontal distance by a telescopic spacer beam 2, one or more pintles 20, supports 21, drum 22, and cable, pipe, or hose 23.

The outer tube 3 is a solid tube with for example a suitable flange 5 for attachment to the side frame 1 of a reeling device. The inner tube is also provided with an appropriate flange for attachment to the side frame as shown in the Figures.

The inner tube 4 has a smaller section than the outer tube 3 such that the inner tube 4 can be fitted inside the outer tube 3 with some clearance to form a telescopic structure as shown in FIGS. 2 and 3.

An important feature of the invention is that the locking device comprises a split part 6 of the inner tube 4. Said split part 6 extends over a part of the length of the inner tube as shown in FIG. 3. Said split part 6 divides the inner tube 4 into sections 7, 8.

The locking device comprises further a force element 9 for creating a swelling force on the split part 6 of the inner tube 4 to press the sections 7, 8 against the inner surface of the outer tube 3.

As described above the inner tube 4 has been split in a certain way. In the embodiment shown the inner tube 4 has been split in the vertical axis into two sections 7, 8. This however not the only possibility but also three, four or even more split sections can be used.

The embodiment shown in FIGS. 2-5 uses square tubes as the outer tube 3 and the inner tube 4. The invention is not however restricted into square tubes but other tube shapes can be used too, as an example a hexagonal form can be used etc.

In the embodiment of the Figures the force element 9 comprises an inflatable bag element or an inflatable hose element. The invention is however not restricted a certain type of force element, i.e. it is also possible to use for example hydraulic or electrical cylinder or a wedge element as a force element 9.

The embodiment shown comprises advantageously also flat bars 10 fixed on the inside of the outer tube 3 to provide a vertical guiding of the inner tube 4 in the outer tube 3. There may also advantageously be guide rolls 11 mounted to outer tube 3 and the inner tube 4 to provide lateral guiding. The guide rolls 11 are preferably spring-loaded guide rolls.

The embodiment may further comprise bars 12 extending over at least a part of the inner tube 4. Said bars 12 are fitted in the inside corners of the outer tube 3. Said bars 12 are preferably half square bars but it should be noted that appropriate other forms may also be used.

When the inflatable or pressurizing bag element 9 is inflated, it exercises a swelling force on the inner tube 4 which will swell with its split part such that the sections 7, 8 are pressed against the bars 12 fitted in the inside corners of the outer tube 3, and thereby fixing or locking the inner tube 4 respective to the outer tube 3. The inflatable bag element 9 may be inflated through an appropriate element for example through a pipe 13.

When the inflatable or pressurizing element 9 is deflated, the swelling force disappears and the inner tube 4 is released with respect to the outer tube 3 so that telescopic movement of the inner tube and the outer tube is enabled.

In this connection it must be noted that the operation of the invention has been described above with an embodiment using an inflatable bag element as a force element 9. This is however not the only possibility but other force elements creating said swelling force can also be used.

The invention has been described above with an embodiment using two interacting tubes. The invention is not restricted to that but it is quite possible in the invention to use also for example three or even more interacting tubes.

As described above the invention, i.e. its structure and operation has been clarified by reference to an embodiment shown in the Figures. The invention is however not restricted to the embodiment shown. The invention, i.e. different structural details, dimensions and features may vary freely within the claims enclosed.

The invention claimed is:

1. A spooling machine comprising:
two side frames spaced at a horizontal distance by a telescopic spacer beam, each of the two sides frames having a pintle on supports for bearing a drum for cable pipe or hose, the telescopic spacer beam comprising at least one outer tube and at least one inner tube, which are slidably and telescopically one inside the other; and
a locking device for locking the outer and inner tube in an adjustable position, the locking device comprising a split part of the inner tube extending over a part of a length of the inner tube and dividing the inner tube into sections, and a force element for creating a swelling force on the split part of the inner tube to press the sections against an inner surface of the outer tube, the force element comprises an inflatable bag element that is inflated to create the swelling force.

2. The spooling machine as claimed in claim 1, wherein the inner tube has been split in a vertical axis into two sections.

3. The spooling machine as claimed in claim 1, wherein there are guide rolls to provide lateral guiding of the inner and outer tubes.

4. The spooling machine as claimed in claim 1, wherein there are flat bars on the inside of the outer tube to provide vertical guiding of the inner tube in the outer tube.

5. The spooling machine as claimed in claim 1, wherein the outer tube and the inner tube are square tubes.

6. The spooling machine as claimed in claim 5, wherein the inner tube has been split in a vertical axis into two sections.

7. The spooling machine as claimed in claim 5, wherein there are bars extending over at least a part of the inner tube, the bars being fitted in inside corners of the outer tube.

8. The spooling machine as claimed in claim 7, wherein the bars are half square bars.

* * * * *